US009151662B2

(12) United States Patent
Bai et al.

(10) Patent No.: US 9,151,662 B2
(45) Date of Patent: Oct. 6, 2015

(54) METHOD FOR VISUALIZING SOUND SOURCE ENERGY DISTRIBUTION IN ECHOIC ENVIRONMENT

(75) Inventors: Mingsian R. Bai, Hsinchu (TW); Ching-Cheng Chen, Hsinchu (TW); Yi-Yang Lo, Hsinchu (TW); Chun-Kai Wang, Hsinchu (TW); Shen-Wei Juan, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 763 days.

(21) Appl. No.: 13/360,123

(22) Filed: Jan. 27, 2012

(65) Prior Publication Data
US 2013/0142357 A1 Jun. 6, 2013

(30) Foreign Application Priority Data
Dec. 2, 2011 (TW) .............................. 100144277 A

(51) Int. Cl.
*H04R 3/00* (2006.01)
*G01H 3/12* (2006.01)

(52) U.S. Cl.
CPC ..................................... *G01H 3/125* (2013.01)

(58) Field of Classification Search
CPC .. H04R 3/005; H04R 1/406; H04R 2201/403; H04R 2430/21; G10L 2021/02166; G01S 3/8083
USPC .................................................. 381/92, 122
See application file for complete search history.

(56) References Cited

U.S. PATENT DOCUMENTS

2003/0228025 A1* 12/2003 Hannah .......................... 381/113
2007/0223711 A1    9/2007 Bai et al.
2012/0140947 A1*  6/2012 Shin ................................ 381/92

OTHER PUBLICATIONS

Zhang, Yong-Bin, Finn Jacobsen, Chuan-Xing Bi, and Xin-Zhao Chen. "Near field acoustic holograph based on the equivalent source method and pressure-velocity transducers." J. Acoust. Soc. Am. 126 (2009): 1257-63.*
Kodrasi, Ina, Thomas Rohdenburg, and Simon Doclo. "Microphone Position Optimization for Planar Superdirective Beamforming." IEEE (May 2011): 109-12. Web.*
Bi, Chuan-Xing, Xin-Zhao Chen, and Jian Chen. "Sound Field Separation Technique Based on Equivalent Source Method and Its Application in Nearfield Acoustic Holography." J. Acoust. Soc. Am. 123 (2008): 1472-78.*
Jacobsen, Finn, and Virginie Jaud. "Statistically Optimized Near Field Acoustic Holography Using an Array of Pressure-Velocity Probes." J. Acoust. Soc. Am. 121 (2007): 1550-58.*

* cited by examiner

*Primary Examiner* — Joseph Saunders, Jr.
*Assistant Examiner* — James Mooney
(74) *Attorney, Agent, or Firm* — Muncy, Geissler, Olds & Lowe, P.C.

(57) ABSTRACT

A method for visualizing sound source energy distribution in an echoic environment comprises steps: arranging in an echoic environment a plurality of arrayed sound pickup units, wherein each sound pickup unit includes at least two microphones separated by a directive distance enabling the sound pickup unit to have a primary pickup direction; disposing the sound pickup units with the primary pickup directions thereof pointing toward a sound source in the echoic environment, and measuring the sound source by the sound pickup units to obtain a sound source-related parameter; substituting the directive distance and the parameter into an algorithm to make the parameter have directivity; and then substituting the parameter into an ESM algorithm to establish a sound source energy distribution profile. Thereby, the method can measure a sound source in a specified direction in an echoic environment and establish a visualized sound source energy distribution profile.

9 Claims, 4 Drawing Sheets

METHOD FOR VISUALIZING SOUND SOURCE ENERGY DISTRIBUTION IN ECHOIC ENVIRONMENT

FIELD OF THE INVENTION

The present invention relates to a sound source energy visualization technology, particularly to a method for visualizing sound source energy distribution in an echoic environment.

BACKGROUND OF THE INVENTION

Nowadays, people pay more and more attention to life quality. Many researches point out that environmental noise affects physiological and psychological health more or less. For example, people are likely to be shocked, anxious, and impatient if they stay in a noisy environment for a long time. The influence of noise may be reduced via three approaches respectively addressing noise source, noise propagation path and noise receptor. For examples, finding out the noise source, reducing the loudness of noise, blocking the propagation path of noise, or isolating the receptor from noise. Among the aforesaid approaches, to find out the noise source, and in advance to study the noise position, the intensity distribution, spectrum distribution and density distribution of noise are fundamental to the effective control of the noise.

A U.S. Patent Publication No. 20070223711 disclosed a system and method for visualizing sound source energy distribution, which uses an array of microphones to receive multiple sound source signals and uses a multi-channel capture device to transform the sound source signals into digital sound source signals, and which uses a sound source energy distribution reconstructor to receive the digital sound source signals and perform a convolution operation to obtain a sound source energy distribution on a retreated focus point surface, whereby are visualized the sound source signals and obtained the distribution state of the sound source signals.

According to the environment where a sound source is situated, the sound sources may be classified into free-space sound sources (such as air planes, automobiles, motorcycles, factories, and building construction sites) and echoic-environment sound sources (such as indoor air conditioners, refrigerators, photostat, smoke exhausters, and blowers). The abovementioned prior art arranges microphones into a microphone array, which is a non-directive sound-pickup technology and unlikely to sample the sound source signals coming from a specified direction. Therefore, the prior art is unsuitable to measure sound signals in an echoic environment. For example, when the prior art is used to diagnose a motor-driven machine in an echoic environment, echo is likely to affect the measurement result and cause measurement errors. Therefore, the prior art has room to improve.

SUMMARY OF THE INVENTION

The primary objective of the present invention is to solve the problem that the conventional sound source measurement system cannot apply to an echoic environment.

To achieve the abovementioned objective, the present invention proposes a method for visualizing sound source energy distribution in an echoic environment, which comprises steps:

arranging a plurality of arrayed sound pickup units in an echoic environment, wherein each sound pickup unit includes at least two microphones separated by a directive distance enabling the sound pickup unit to have a primary pickup direction;

disposing sound pickup units with the primary pickup directions thereof pointing toward a sound source in the echoic environment to measure the sound source and obtain a sound pressure parameter;

substituting the directive distance and the sound pressure parameter into an array-based algorithm to obtain a directive sound pressure parameter; and substituting the directive sound pressure parameter into an ESM (Equivalent Source Method) algorithm to establish a sound source energy distribution profile.

The present invention also proposes a further method for visualizing sound source energy distribution in an echoic environment, which comprises steps:

arranging a plurality of arrayed sound pickup units in an echoic environment, wherein each sound pickup unit includes at least two microphones separated by a directive distance enabling the sound pickup unit to have a primary pickup direction;

disposing the sound pickup units with the primary pickup directions thereof pointing toward a sound source in the echoic environment to measure the sound source and obtain at least two sound pressure parameters;

substituting the directive distance and the sound pressure parameters into a finite difference algorithm to obtain a particle velocity parameter; and substituting the particle velocity parameter into an ESM (Equivalent Source Method) algorithm to establish a sound source energy distribution profile.

In summary, the present invention uses the sound pickup units each having at least two microphones separated by a directive distance to obtain the sound pressure parameters, uses the directive distance and the sound pressure parameters to obtain a directive sound pressure parameter or a particle velocity parameter, substitutes the directive sound pressure parameter or the particle velocity parameter into an ESM (Equivalent Source Method) algorithm to obtain a sound source energy distribution profile. The present invention can measure a sound source in a specified direction in an echoic environment and visualize the sound source, whereby are obtained the accurate position of the sound source and the energy distribution thereof.

DETAILED DESCRIPTION OF THE PREFERRED EMBODIMENTS

The technical contents of the present invention are described in detail in cooperation with the drawings below.

Figure 1:
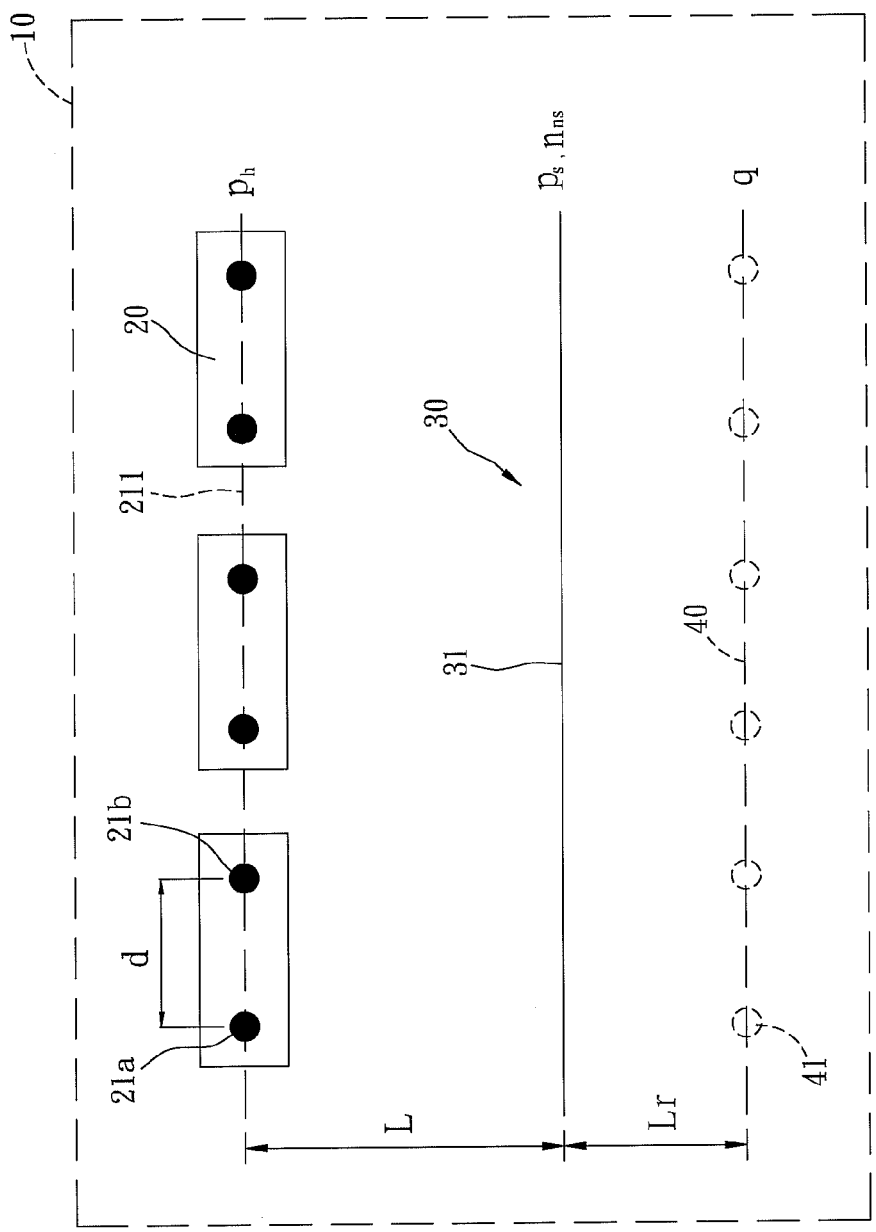
FIG. 1 schematically shows an architecture according to a first embodiment of the present invention.
Figure 2:
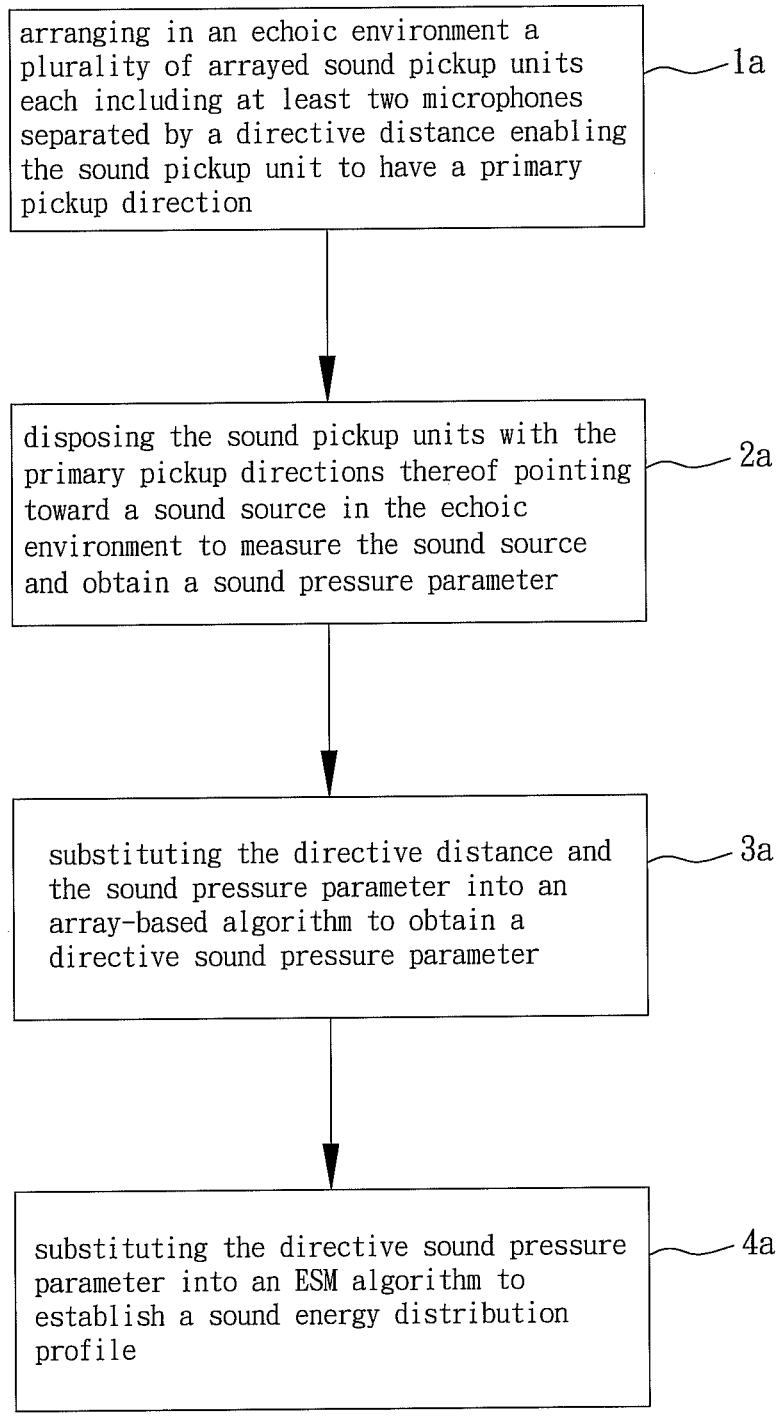
FIG. 2 shows a flowchart of a method according to the first embodiment of the present invention.

Refer to FIG. 1 and FIG. 2. FIG. 1 schematically shows an architecture according to a first embodiment of the present invention. FIG. 2 shows a flowchart of a method according to the first embodiment of the present invention. The first embodiment of the present invention proposes a method for visualizing sound source energy distribution in an echoic environment, which comprises the following steps.

Step 1a: Firstly, a plurality of arrayed sound pickup units 20 are arranged in an echoic environment 10. Each sound pickup unit 20 includes at least two microphones 21a and 21b separated by a directive distance d, and the directive distance d enables the sound pickup unit 20 to have a primary pickup direction. In the first embodiment, the microphones 21a and 21b are microelectromechanical microphones and arranged to form a microphone face 211.

Step 2a: The sound pickup units 20 are disposed with the primary pickup directions thereof pointing toward a sound source 30 in the echoic environment 10. The sound source 30 forms a sound source face 31. The sound source face 31 and the microphone face 211 are separated by a distance L. The sound source 30 has a wavelength. The directive distance d is smaller than half the wavelength. The microphones 21a and 21b receive the signals of the sound source 30 and measure the sound source 30 to obtain a sound pressure parameter.

Step 3a: The directive distance d and the sound pressure parameter are substituted into an array-based algorithm to obtain a directive sound pressure parameter. The array-based algorithms include the first-order difference microphone array algorithm and the beam pattern optimization algorithm. The first-order difference microphone array algorithm is used to improve directivity and increase SNR (signal-to-noise ratio). In the first-order difference microphone array algorithm, each microphone receives a signal; after a delay time, the microphone receives a delayed signal; the signal is subtracted from the delay signal to obtain a first-order difference microphone; then the directive sound pressure parameter is obtained. For the details of the first-order difference microphone array algorithm, please refer to "Jeffery J. Leader, Numerical Analysis and Scientific Computation, ISBN: 978-0201734997, Addison Wesley, 2004", which is incorporated in the specification and regarded as a part of the present invention.

The beam pattern optimization algorithm includes the MDI (Maximum for Directive Index) method, the MFBR (Maximum for Front-to-Back Ratio) method, the MCBW (Maximum for Constant Beam Width) method, and the optimal two-microphone directive endfire array method. The above-mentioned methods, which can be used to obtain the directive sound pressure parameter, are described below.

$$\text{Firstly, } y(\omega) = w^H x = w^H a(\omega, \theta, \phi) s(\omega) \quad (1)$$

is used to express the directive sound pressure parameter, wherein w is the frequency domain coefficient, H the conjugate transpose, x the microphone signal, $a(\omega, \theta, \phi)$ the vectors determined by the positions where the microphones 21a and 21b are located, $s(\omega)$ the measured sound pressure parameter. If the microphones 21a and 21b respectively detect the sound pressure signals as P1 and P2, $s(\omega)$ equals (P1+P2)/2.

Next, the MDI method, the MFBR method, the MCBW method or the optimal two-microphone directive endfire array method is used to obtain w. Then, w is substituted into Equation (1) to obtain $y(\omega)$, i.e. the directive sound pressure parameter.

The MDI method works out w according to Equations (2)-(4):

$$DI(\omega, \theta_0, \varphi_0) = 10\log_{10}\left(\frac{w^H A w}{w^H B w}\right) \quad (2)$$

$$A = a(\omega, \theta_0, \varphi_0) a^H(\omega, \theta_0, \varphi_0) \quad (3)$$

$$B = \frac{1}{4\pi} \int_0^{2\pi} \int_0^{\pi} a(\omega, \theta, \varphi) a^H(\omega, \theta, \varphi) \sin\theta d\theta d\varphi \quad (4)$$

For the MDI method, please refer to "Steven L. Gay & Jacob Benesty, Acoustic signal processing for telecommunication, ISBN: 978-0792378143, Springer, 2000", which is incorporated in the specification and regarded as a part of the present invention.

The MFBR method works out w according to Equations (5)-(7):

$$FBR(\omega) = \frac{w^H A w}{w^H B w} \quad (5)$$

$$A = \frac{1}{2\pi} \int_0^{2\pi} \int_0^{\frac{\pi}{2}} a(\omega, \theta, \varphi) a^H(\omega, \theta, \varphi) \sin\theta d\theta d\varphi \quad (6)$$

$$B = \frac{1}{2\pi} \int_0^{2\pi} \int_{\frac{\pi}{2}}^{\pi} a(\omega, \theta, \varphi) a^H(\omega, \theta, \varphi) \sin\theta d\theta d\varphi \quad (7)$$

For the MFBR method, please refer to "Steven L. Gay & Jacob Benesty, Acoustic signal processing for telecommunication, ISBN: 978-0792378143, Springer, 2000", which is incorporated in the specification and regarded as a part of the present invention.

The MCBW method works out w according to Equations (8)-(10):

$$CBW(\omega) = \frac{w^H A w}{w^H B w} \quad (8)$$

$$A = \int_0^{2\pi} \int_0^{\theta_1} a(\omega, \theta, \varphi) a^H(\omega, \theta, \varphi) \sin\theta d\theta d\varphi \quad (9)$$

$$B = \frac{1}{4\pi} \int_0^{2\pi} \int_0^{\pi} a(\omega, \theta, \varphi) a^H(\omega, \theta, \varphi) \sin\theta d\theta d\varphi \quad (10)$$

For the MCBW method, please refer to "Steven L. Gay & Jacob Benesty, Acoustic signal processing for telecommunication, ISBN: 978-0792378143, Springer, 2000", which is incorporated in the specification and regarded as a part of the present invention.

In the first embodiment, the optimal two-microphone directive endfire array method is used to exemplify the process of obtaining w.

Firstly, work out the directivity factor (DF) according to Equation (11):

$$DF = \frac{|w^H a|^2}{w^H R_{vv} w} \quad (11)$$

wherein $R_{vv}$ is the noise intensity expressed by Equation (12):

$$\{R_{vv}\}_{mn} = \frac{\sin[(m-n)kd]}{(m-n)kd}, m, n = 1, 2, \ldots, M \quad (12)$$

Next, work out the white noise gain (WNG) according to Equation (13):

$$WNG = \frac{|w^H a|^2}{w^H w} \quad (13)$$

For convenience of computation, let $|w^H a|=1$ and obtain Equation (14):

$$WNG = \frac{|w^H a|^2}{w^H w} = \frac{1}{\|w\|_2^2} \quad (14)$$

The w designed according to the DF has a great amount of noise while the w designed according to WNG has poor directivity. Therefore, the design of w adopts the compromise between DF and WNG, which is expressed by Equation (15):

$$\min_w \left( \frac{1}{DF} + \varepsilon \frac{1}{WNG} \right) = \min_w \left[ \frac{w^H R_{vv} w}{w^H a(\theta_0) a^H(\theta_0) w} + \varepsilon \frac{w^H w}{w^H a(\theta_0) a^H(\theta_0) w} \right] \quad (15)$$
$$= \min_w \left[ \frac{w^H (R_{vv} + \varepsilon I) w}{w^H a(\theta_0) a^H(\theta_0) w} \right]$$
$$= \max_w \left[ \frac{w^H a(\theta_0) a^H(\theta_0) w}{w^H (R_{vv} + \varepsilon I) w} \right]$$

wherein a is a vector, and $\theta_0$ the angle of the presumed axis of the array under axial symmetry, and wherein $\varepsilon$ is the weighting parameter of DF to WNG, and wherein $0<\varepsilon<1$. In the embodiment of a two-element endfire array, $\theta_0=0$, and $$a(\theta, \varphi) = [1 \quad e^{jkd\cos\theta}]^T \quad (16)$$

$$R_{vv} = \begin{bmatrix} 1 & \frac{\sin kd}{kd} \\ \frac{\sin kd}{kd} & 1 \end{bmatrix} \quad (17)$$

Substitute Equation (16) and Equation (17) into Equation (15) to obtain Equation (18), and use Equation (18) to obtain w:

$$w_{SD} = \frac{(R_{vv} + \varepsilon I)^{-1} a(\theta_0)}{a^H(\theta_0)(R_{vv} + \varepsilon I)^{-1} a(\theta_0)} \quad (18)$$

Step 4a: The directive sound pressure parameter is substituted into an ESM (Equivalent Source Method) algorithm to establish a sound source energy distribution profile. In the first embodiment, the ESM algorithm presumes that a virtual sound source face 40 locates on one side of the sound source face 31, which is far away from the microphone face 211, and that the virtual sound source face 40 and the microphone face 211 are separated by a distance Lr, and that the virtual sound source face 40 has at least one equivalent source point 41 that is equivalent to the sound source 30. Next, use the known directive sound pressure parameter to work out the sound pressure and particle velocity at the position of the sound source 30. Then is established the sound source energy distribution profile. Refer to the following equations for further discussion.

$$P_h = i\rho ck G_{hp} Q \quad (19)$$

$$Q = [q(r_{o1}), q(r_{o2}), \ldots, q(r_{on})]^T \quad (20)$$

$$G_{hp|m,n} = g(r_{hm}, r_{on}) = -\frac{e^{ikr}}{4\pi r}, r = |r_{hm} - r_{on}| \quad (21)$$

wherein $P_h$ is the directive sound pressure parameter, Q the column vector of each equivalent source point $q(r_{on})$, $G_{hp}$ the Green's function, $\rho$ the density of medium, c the velocity of sound, i an imaginary number, k the wave parameter, $r_{hm}$ the position vector of the mth measured point, and $r_{on}$ the position vector of the nth measured point. Firstly, use the inverse matrix of $G_{hp}$ (obtained according to the Tikhonov regularization) and other parameters to obtain Q according to Equation (22):

$$Q = \frac{1}{i\rho ck} G_{hp}^+ P_h \quad (22)$$

Next, substitute the output Q and $G_{sp}$ into Equations (23) and (24):

$$P_s = i\rho ck G_{sp} Q \quad (23)$$

$$U_{ns} = G_{sv} Q \quad (24)$$

to obtain $P_s$ and $U_{ns}$, wherein $G_{sp}$ is the matrix of the free-space Green's function. $g(x,x_0)=(1/r)e^{-jkr}$, and $r=|x-x_0|$. $G_{sv}$ is the source function of sound pressure, and $G_{sv}=(\partial/\partial n)g(x, x_0)$. $P_s$ is the sound pressure at the position of the sound source 30. $U_{ns}$ is the particle velocity at the position of the sound source 30. Then, use the sound pressure and the particle velocity to establish the sound energy distribution profile.

Figure 3:
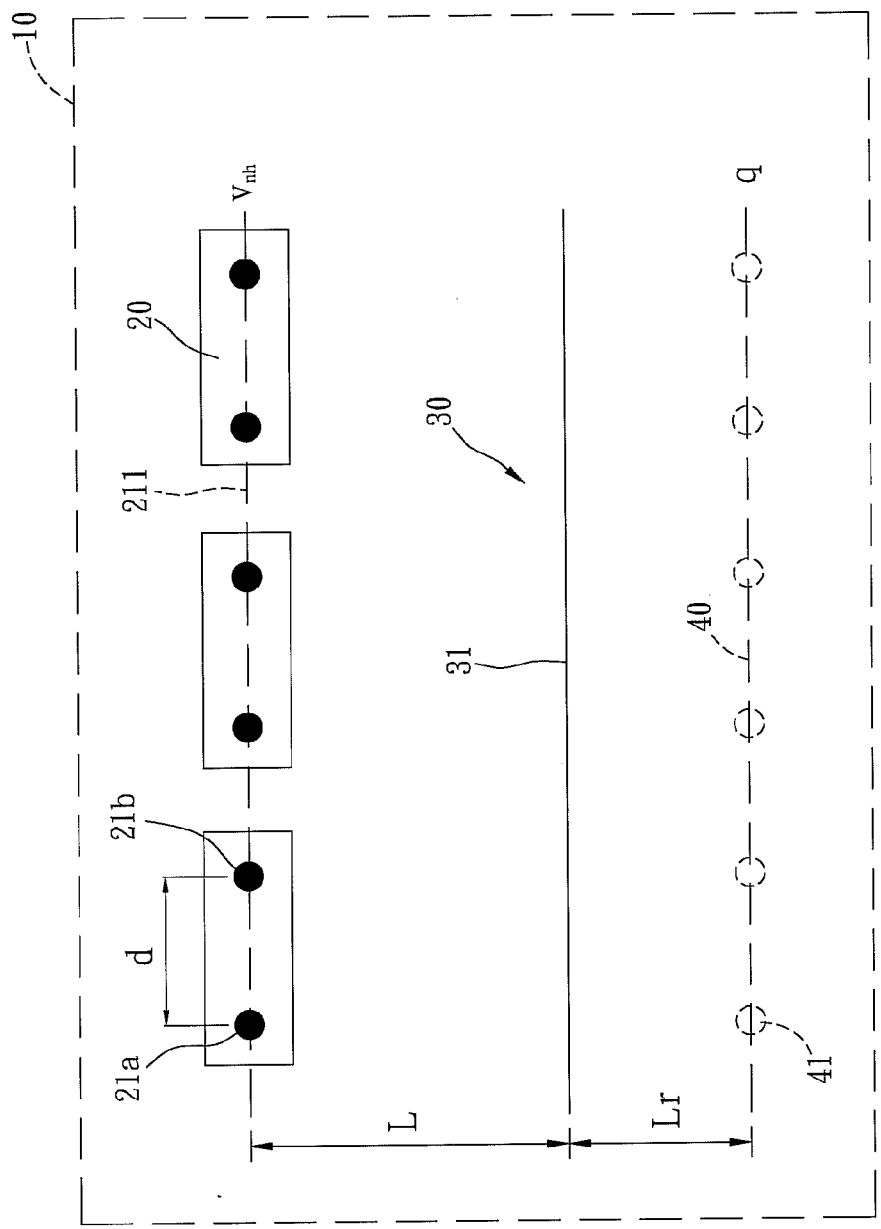
FIG. 3 schematically shows an architecture according to a second embodiment of the present invention.
Figure 4:
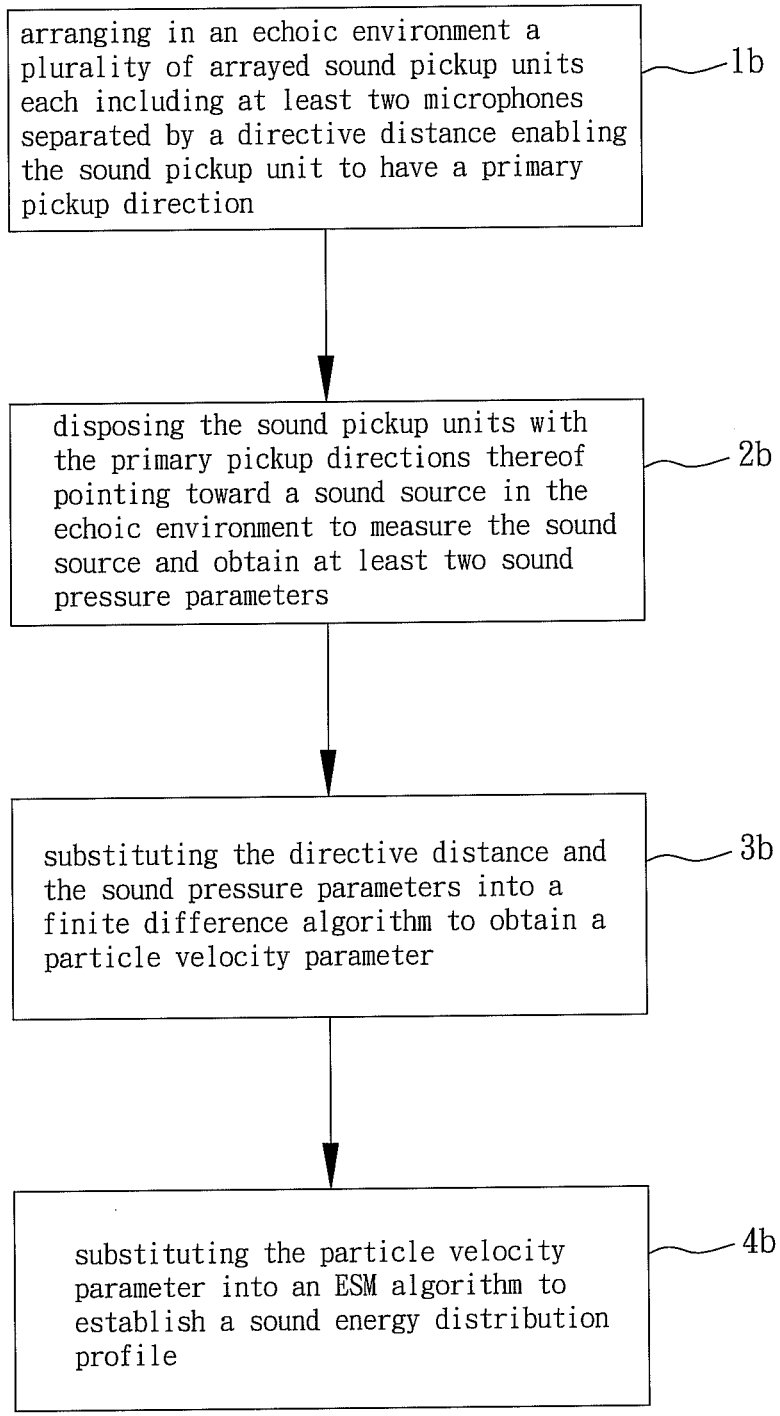
FIG. 4 shows a flowchart of a method according to the second embodiment of the present invention.

Refer to FIG. 3 and FIG. 4. FIG. 3 schematically shows an architecture according to a second embodiment of the present invention. FIG. 4 shows a flowchart of a method according to the second embodiment of the present invention. The second embodiment of the present invention proposes a method for visualizing sound source energy distribution in an echoic environment, which comprises the following steps.

Step 1b: Firstly, a plurality of arrayed sound pickup units 20 is arranged in an echoic environment 10. Each sound pickup unit 20 includes at least two microphones 21a and 21b separated by a directive distance d, and the directive distance d enables the sound pickup unit 20 to have a primary pickup direction. In the second embodiment, the microphones 21a and 21b are arranged to form a microphone face 211.

Step 2b: The sound pickup units 20 are disposed with the primary pickup directions thereof pointing toward a sound source 30 in the echoic environment 10. The sound source 30 forms a sound source face 31. The sound source face 31 and the microphone face 211 are separated by a distance L. The sound source 30 has a wavelength. The directive distance d is smaller than half the wavelength. The microphones 21a and 21b receive the signals of the sound source 30 and measure the signals of the sound source 30 to obtain at least two sound pressure parameters.

Step 3b: The directive distance d and the sound pressure parameters are substituted into a finite difference algorithm to obtain a particle velocity parameter. Herein, the Euler's equation (Equation (25)) and the two-particle finite difference estimation (Equation (26)) are used to obtain the particle velocity parameter.

$$u = \frac{i}{\rho_0 \omega} \nabla p = \frac{i}{\rho_0 \omega} \frac{dp}{dx} \quad (25)$$

$$\frac{dp}{dx} \approx \frac{p_2 - p_1}{\Delta x} \quad (26)$$

wherein P is the sound pressure, $\Delta x$ the distance between two points, $\rho_0$ the density of air, and $\omega$ the angular frequency.

Step 4b: The particle velocity parameter is substituted into an ESM (Equivalent Source Method) algorithm to establish a sound energy distribution profile. In the second embodiment, the ESM algorithm presumes that a virtual sound source face 40 locates on one side of the sound source face 31, which is far away from the microphone face 211, and that the virtual sound source face 40 has at least one equivalent source point 41 that is equivalent to the sound source 30. Next, use the known particle velocity parameter to work out the particle velocity at the position of the sound source 30. Then is established the sound source energy distribution profile. Refer to the following equations for further discussion.

$$V_{nh} = i\rho ck G_{hv} Q \quad (27)$$

$$G_{sv|m,n} = \frac{\partial g(r_{sm}, r_{on})}{\partial n_s} \quad (28)$$

wherein $V_{nh}$ is the particle velocity parameter, Q the column vector of each equivalent source point $q(r_{on})$, $G_{hv}$ the Green's function, $\rho$ the density of medium, c the velocity of sound, i an imaginary number, k the wave parameter, $r_{sm}$ the position vector of the mth measured point, $r_{on}$ the position vector of the sound source, and $n_s$ an outward normal. Firstly, use the inverse matrix of $G_{hv}$ (obtained according to the Tikhonov regularization) and other parameters to obtain Q according to Equation (29):

$$Q = \frac{1}{i\rho ck} G_{hv}^+ v_{nh} \quad (29)$$

Next, substitute the output Q and $G_{sp}$ into Equations (30) and (31):

$$P_s = i\rho ck G_{sp} Q \quad (30)$$

$$U_{ns} = G_{sv} Q \quad (31)$$

to obtain $P_s$ and $U_{ns}$, wherein $G_{sp}$ is the matrix of the free-space Green's function. $g(x,x_0) = (1/r)e^{-jkr}$, and $r=|x-x_0|$. $G_{sv}$ is the source function of sound pressure, and $G_{sv}=(\partial/\partial n)g(x,x_0)$. $P_s$ is the sound pressure at the position of the sound source 30. $U_{ns}$ is the particle velocity at the position of the sound source 30. Then, use the sound pressure and the particle velocity to establish the sound energy distribution profile.

Further, the sound intensity I is obtained via substituting the sound pressure and the particle velocity into Equation (32):

$$I = \langle pu \rangle_t = \frac{1}{2}\text{Re}\{\tilde{p} * \tilde{u}\} = \frac{-1}{2\rho_0 \omega}\text{Im}\{\tilde{p} * \Delta \tilde{p}\} \quad (32)$$

In conclusion, the present invention uses sound pickup units each containing at least two microphones separated by a directive distance to measure a sound source and obtain sound pressure parameters, and use the directive spacing and the sound pressure parameters to work out a directive sound pressure parameter or a particle velocity parameter. Next, the present invention substitutes the directive sound pressure parameter or the particle velocity parameter into an ESM (Equivalent Source Method) algorithm to obtain the sound pressure and the particle velocity at the position of the sound source and then establish a sound source energy distribution profile, whereby is achieved the function of measuring a sound source in an echoic environment. Further, the present invention visualizes the sound source, whereby is accurately detected the position of the sound source and the sound source energy distribution. Furthermore, the present invention uses the optimal two-microphone directive endfire array method to work out the frequency domain coefficient w, considering not only the directivity of the sound source but also the noise of the microphones, whereby is more accurately obtained the sound source energy distribution.

Therefore, the present invention possesses utility, novelty and non-obviousness and meets the condition for a patent. Thus, the Inventors file the application for a patent. It is appreciated if the patent is approved fast.

The embodiments described above are only to exemplify the present invention but not to limit the scope of the present invention. Any equivalent modification or variation according to the spirit of the present invention is to be also included within the scope of the present invention.

What is claimed is:

1. A method for visualizing sound source energy distribution in an echoic environment, comprising:
   arranging a plurality of arrayed sound pickup units in an echoic environment, wherein each sound pickup unit includes at least two microphones separated by a directive distance enabling the sound pickup unit to have a primary pickup direction;
   disposing the sound pickup units with the primary pickup directions thereof pointing toward a sound source in the echoic environment to measure the sound source, wherein each of the microphones obtains a sound pressure signal and the sound pressure of each microphone within the sound pickup unit is added and divided by the number of the microphones to obtain a sound pressure parameter;
   substituting the directive distance and the sound pressure parameter into a value-array based algorithm to obtain a directive sound pressure parameter;
   substituting the directive sound pressure parameter into an ESM (Equivalent Source Method); and
   calculating a sound source energy distribution profile.

2. The method for visualizing sound source energy distribution in an echoic environment according to claim 1, wherein the microphones are microelectromechanical microphones.

3. The method for visualizing sound source energy distribution in an echoic environment according to claim 1, wherein the value-array based algorithm is a first-order difference microphone array algorithm or a beam pattern optimization algorithm.

4. The method for visualizing sound source energy distribution in an echoic environment according to claim 3, wherein the beam pattern optimization algorithm is selected from a group consisting of an MDI (Maximum for Directive Index) method, an MFBR (Maximum for Front-to-Back Ratio) method, an MCBW (Maximum for Constant Beam Width) method, and an optimal two-microphone directive endfire array method.

5. The method for visualizing sound source energy distribution in an echoic environment according to claim 1, wherein the sound source has a wavelength, and wherein the directive distance is smaller than half the wavelength.

6. A method for visualizing sound source energy distribution in an echoic environment, comprising:
   arranging a plurality of arrayed sound pickup units in an echoic environment, wherein each sound pickup unit includes at least two microphones separated by a directive distance enabling the sound pickup unit to have a primary pickup direction;
   disposing the sound pickup units with the primary pickup directions thereof pointing toward a sound source in the echoic environment to measure the sound source and obtain at least two sound pressure parameters;
   substituting the directive distance between the at least two microphones and the sound pressure parameters into a finite difference algorithm to obtain a particle velocity parameter;
   substituting the particle velocity parameter into an ESM (Equivalent Source Method); and calculating a sound source energy distribution profile.

7. The method for visualizing sound source energy distribution in an echoic environment according to claim 6, wherein the microphones are microelectromechanical microphones.

8. The method for visualizing sound source energy distribution in an echoic environment according to claim 6, wherein the sound source has a wavelength, and wherein the directive distance is smaller than half the wavelength.

9. The method for visualizing sound source energy distribution in an echoic environment according to claim 6, wherein the sound pressure parameters and the particle velocity parameter are used to obtain a sound intensity parameter.

\* \* \* \* \*